(12) United States Patent
Lin et al.

(10) Patent No.: US 11,386,326 B2
(45) Date of Patent: Jul. 12, 2022

(54) TRAINING A MACHINE LEARNING MODEL WITH LIMITED TRAINING DATA

(71) Applicant: The Regents of the University of California, Oakland, CA (US)

(72) Inventors: Fang Lin, San Diego, CA (US); Mohammad Ghasemzadeh, San Diego, CA (US); Bita Darvish Rouhani, San Diego, CA (US); Farinaz Koushanfar, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 386 days.

(21) Appl. No.: 16/438,326

(22) Filed: Jun. 11, 2019

(65) Prior Publication Data
US 2019/0378015 A1  Dec. 12, 2019

Related U.S. Application Data

(60) Provisional application No. 62/683,494, filed on Jun. 11, 2018.

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
CPC ................................ G06N 3/082; G06N 3/04
USPC .......................................................... 706/25
See application file for complete search history.

(56) References Cited

U.S. PATENT DOCUMENTS

2020/0019882 A1* 1/2020 Garg .................... G06F 3/0484

OTHER PUBLICATIONS

Yang, et al., "Learning the sparse representation for classification", 2011 IEEE International Conference on Multimedia and Expo, Jul. 11-15, 2011 (Year: 2011).*
Bagherinezhad, H. et al., "LCNN: Lookup-based convolutional neural network." In Proc. IEEE CVPR, 2017.
Bolukbasi, T. et al., "Adaptive neural networks for efficient inference." In International Conference on Machine Learning, pp. 527-536, 2017.
Bronstein, M. M. et al., "Geometric deep learning: going beyond Euclidean data." *IEEE Signal Processing Magazine*, 34(4):18-42, 2017.

(Continued)

*Primary Examiner* — Tsu-Chang Lee
(74) *Attorney, Agent, or Firm* — Mintz Levin Cohn Ferris Glovsky and Popeo, P.C.

(57) ABSTRACT

A method may include a transforming a trained machine learning model including by replacing at least one layer of the trained machine learning model with a dictionary matrix and a coefficient matrix. The dictionary matrix and the coefficient matrix may be formed by decomposing a weight matrix associated with the at least one layer of the trained machine learning model. A product of the dictionary matrix and the coefficient matrix may form a reduced-dimension representation of the weight matrix associated with the at least one layer of the trained machine learning model. The transformed machine learning model may be deployed to a client. Related systems and computer program products are also provided.

20 Claims, 13 Drawing Sheets

(56) References Cited

OTHER PUBLICATIONS

Fei-Fei, L. et al., "One-shot learning of object categories." *IEEE transactions on pattern analysis and machine intelligence*, 28(4):594-611, 2006.

Garcia, V. et al., "Few-shot learning with graph neural networks." *arXiv preprint arXiv:1711.04043*, 2017.

Howard, A. G. et al., "Mobilenets: Efficient convolutional neural networks for mobile vision applications." *arXiv preprint arXiv:1704.04861*, 2017.

Kipf, T. N. et al., "Semi-supervised classification with graph convolutional networks." *arXiv preprint arXiv:1609.02907*, 2016.

Koch, G. et al., "Siamese neural networks for one-shot image recognition." In ICML Deep Learning Workshop, vol. 2, 2015.

Krizhevsky, A. et al., "Imagenet classification with deep convolutional neural networks." In Advances in neural information processing systems, pp. 1097-1105, 2012.

Lake, B.M. et al., "Human-level concept learning through probabilistic program induction." *Science*, 350(6266):1332-1338, 2015.

LeCun, Y. et al., "MNIST handwritten digit database." *AT&T Labs [Online], Available*: http://yann. lecun. com/exdb/mnist, 2, 2010.

Li, Z. et al., "Learning without forgetting." *IEEE Transactions on Pattern Analysis and Machine Intelligence*, 2017.

Mehrotra, A. et al., "Generative adversarial residual pairwise networks for one shot learning." *arXiv preprint arXiv:1703.08033*, 2017.

Mishra, N. et al., "A simple neural attentive meta-learner." In *NIPS 2017 Workshop on Meta-Learning*, 2017.

Munkhdalai, T. et al., "Meta networks." arXiv preprint arXiv:1703.00837, 2017.

Ravi, S. et al., "Optimization as a model for few-shot learning." 2016.

Rouhani, B.D. et al., "Deep3: Leveraging three levels of parallelism for efficient deep learning." In Proceedings of the 54th Annual Design Automation Conference 2017, p. 61. ACM, 2017.

Snell, J. et al., "Prototypical networks for few-shot learning." In Advances in Neural Information Processing Systems, pp. 4080-4090, 2017.

Vinyals, O. et al., "Matching networks for one shot learning." In Advances in Neural Information Processing Systems, pp. 3630-3638, 2016.

Zhang, X. et al., "Shufflenet: An extremely efficient convolutional neural network for mobile devices." arXiv preprint arXiv:1707.01083, 2017.

\* cited by examiner

TRAINING A MACHINE LEARNING MODEL WITH LIMITED TRAINING DATA

RELATED APPLICATION

This application claims priority to U.S. Provisional Application No. 62/683,494 entitled "AN EFFICIENT METHOD FOR FEW-SHOT LEARNING and filed on Jun. 11, 2018, the disclosure of which is incorporated herein by reference in its entirety.

TECHNICAL FIELD

The subject matter described herein relates generally to machine learning and more specifically to a training a machine learning model with limited training data.

BACKGROUND

Machine learning models may be trained to perform a variety of cognitive tasks including, for example, object identification, natural language processing, information retrieval, and speech recognition. In particular, deep learning models (e.g., neural networks, belief networks, restricted Boltzmann machines, and/or the like) may be especially adept at providing accurate inferences for a variety of complex user behavior. These inferences may be based on data collected by sensors (e.g., biometric readers, accelerometers, gyroscopes, microphones, cameras, and/or the like) embedded in portable platforms including, for example, drones, robots, smartphones, tablet computers, wearable apparatuses (e.g., smart watches, fitness trackers, and/or the like), and voice assistants.

SUMMARY

Systems, methods, and articles of manufacture, including computer program products, are provided for a training a machine learning model. In some example embodiments, there is provided a system that includes at least one processor and at least one memory. The at least one memory may include program code that provides operations when executed by the at least one processor. The operations may include: transforming a trained machine learning model including by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model; and deploying, to a client, the transformed machine learning model.

In some variations, one or more features disclosed herein including the following features can optionally be included in any feasible combination. The at least one layer of the trained machine learning model may be a fully-connected layer and/or a convolution layer of the trained machine learning model.

In some variations, a machine learning model may be trained, based at least on a first training data, to generate the trained machine learning model. The training of the machine learning model may include adjusting one or more weights included in the weight matrix to at least minimize an error in an output of the machine learning model.

In some variations, the transformed machine learning model may be updated, at the client, based at least on a second training data. The update to the transformed machine learning model may be limited to a first portion of the transformed machine learning model while a second portion of the transformed machine learning model remains unaffected by the update.

In some variations, the update to the transformed machine learning model may be limited to one or more coefficient matrices associated with one or more layers of the transformed machine learning model.

In some variations, the update to the transformed machine learning model may be limited to a single dictionary matrix associated with a single layer of the transformed machine learning model. The update to the transformed machine learning model may be further limited to inserting, into the single dictionary matrix, one or more rows corresponding to the second training data without modifying any existing portions of the single dictionary matrix. The single layer of the trained machine learning model may be a final layer of the transformed machine learning model prior an output of the transformed machine learning model.

In some variations, the decomposing of the weight matrix may include increasing a length of the dictionary matrix until a decomposition error associated with the at least one layer of the trained machine learning model is below a threshold value. The decomposition error includes a difference between the weight matrix and the reduced-dimension representation of the weight matrix comprising the product of the dictionary matrix and the coefficient matrix. A first layer of the trained machine learning model is associated with a first threshold value and a second layer of the trained machine learning model may be associated with a second threshold value. The first threshold value and/or the second threshold value may be adjusted based at least on one or more resource constraints associated with the client. The first threshold value and/or the second threshold value may be adjusted based at least on a target accuracy for the transformed machine learning model.

In some variations, each column in the weight matrix may be a linear combination of one or more columns from the dictionary matrix as determined by the coefficient matrix.

In some variations, the trained machine learning model may be a neural network.

In another aspect, there is provided a method for training a machine learning model. The method may include: transforming a trained machine learning model including by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model; and deploying, to a client, the transformed machine learning model.

In some variations, one or more features disclosed herein including the following features can optionally be included in any feasible combination. The method may further include training, based at least a first training data, a machine learning model to generate the trained machine learning model. The training of the machine learning model may include adjusting one or more weights included in the weight matrix to at least minimize an error in an output of the machine learning model.

In some variations, the transformed machine learning model may be updated, at the client, based at least on a second training data. The update to the transformed machine learning model may be limited to a first portion of the transformed machine learning model while a second portion of the transformed machine learning model remains unaffected by the update.

In some variations, the update to the transformed machine learning model is limited to one or more coefficient matrices associated with one or more layers of the transformed machine learning model.

In some variations, the update to the transformed machine learning model may be limited to a single dictionary matrix associated with a single layer of the transformed machine learning model. The update to the transformed machine learning model may be further limited to inserting, into the single dictionary matrix, one or more rows corresponding to the second training data without modifying any existing portions of the single dictionary matrix.

In another aspect, there is provided a computer program product including a non-transitory computer readable medium storing instructions. The instructions may cause operations may executed by at least one data processor. The operations may include: transforming a trained machine learning model including by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model; and deploying, to a client, the transformed machine learning model.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
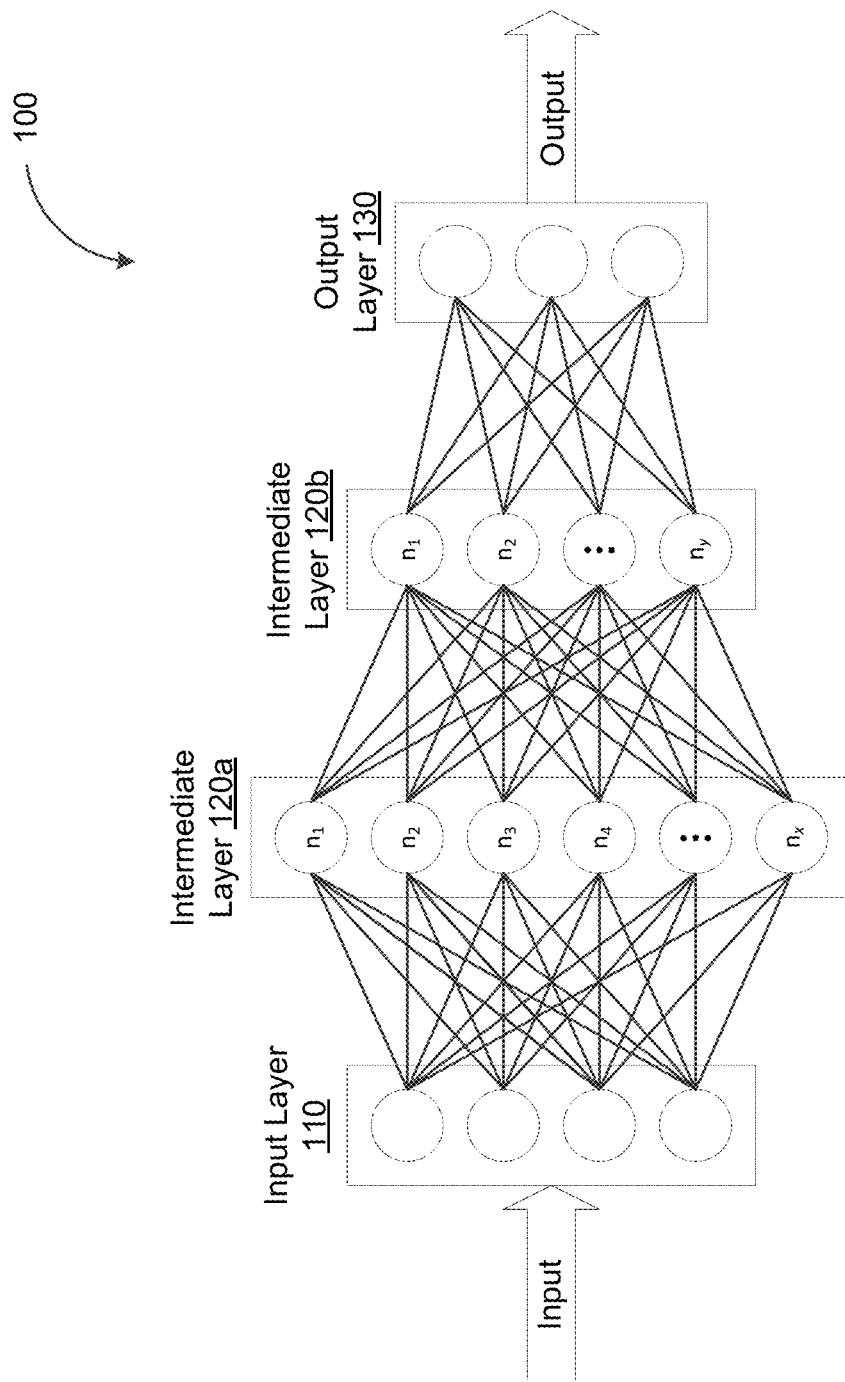
FIG. 1 depicts a schematic diagram illustrating an example of a machine learning model, in accordance with some example embodiments.

A machine learning model may be used to analyze raw data in order to perform a variety of cognitive tasks including, for example, object identification, natural language processing, information retrieval, and speech recognition.

However, the high resource overhead associated with updating a trained machine learning model may prevent the machine learning model from being deployed on resource-constrained remote devices including, for example, drones, robots, smartphones, tablet computers, wearable apparatuses, voice assistants, and/or the like. Remote devices may lack, for example, sufficient resources to update the trained machine learning model with a large quantity of training data and/or over numerous training iterations. As such, updates to the trained machine learning model are typically offloaded to a cloud server with more abundant resources. Nevertheless, updating the trained machine learning model at the cloud server may incur significant communication overhead. Moreover, such updates may not be customizable for individual users across different remote devices.

In some example embodiments, the trained machine learning model that is deployed to a remote device may be transformed to at least reduce the resources required to update the trained machine learning model. For example, training the machine learning model may include adjusting the values of the weights applied at each layer of the machine learning model to at least minimize an error in the output of the machine learning model. Accordingly, each layer of the trained machine learning model may be associated with a weight matrix. Transforming the trained machine learning model may include replacing at least one layer of the trained machine learning model with a dictionary matrix and a coefficient matrix formed by at least decomposing the weight matrix associated with that layer of the trained machine learning model. The transformed machine learning model may impose less resource overhead than a conventional machine learning model. As such, the transformed machine learning model may be updated at a remote device without requiring a large quantity of training data and/or numerous iterations of training. Updating the transformed machine learning model at the remote device without requiring a large quantity of training data and/or numerous training iterations may be referred to as "few-shot learning."

The weight matrix associated with a layer of the trained machine learning model may be reconstructed by linearly combining, based at least on a coefficient matrix, one or more columns of a corresponding dictionary matrix. The length of the dictionary matrix (e.g., the quantity of columns in the dictionary matrix) may determine a decomposition error, which may indicate the quantity discrepancies between the reconstructed weight matrix and the original weight matrix. Moreover, the length of the dictionary matrix may determine the accuracy of the transformed machine learning model in performing a cognitive task. For example, increasing the length of the dictionary matrix may decrease decomposition error and increase the accuracy of the transformed machine learning model. However, increasing the length of the dictionary matrix may also increase the resource burden associated with updating the transformed machine learning model. Accordingly, in some example embodiments, the transformation of the trained machine learning model may include decomposing, based at least on a decomposition error threshold, the weight matrix associated with at least one layer of the machine learning model into a dictionary matrix of a corresponding length.

The transformed machine learning model may be updated at a remote device based on additional training data acquired at the remote device. According to some example embodiments, the updates to the transformed machine learning model may be limited to a first portion of the transformed machine learning model while a second portion of the transformed machine learning model remains unaffected by the update. Updating some but not all portions of the transformed machine learning model may further reduce the resource overhead associated with updating the machine learning model while preserving the post-update accuracy of the transformed machine learning model. For example, the transformed machine learning model may be updated without modifying the existing weights applied by the transformed machine learning model and thus preserve the existing knowledge of the transformed machine learning model. Moreover, limiting the update to a portion of the transformed machine learning model may reduce the energy consumption and hardware complexity (e.g., the quantity of flip-flops or latches) associated with updating the transformed machine learning model.

In some example embodiments, the transformed machine learning model may be updated at the remote device by at least updating, based on the additional training data, the coefficient matrices associated with one or more layers of the transformed machine learning model but not the corresponding dictionary matrices. Alternatively, the transformed machine learning model may be updated at the remote device by updating the dictionary matrix of some but not all of the layers of the transformed machine learning model. For example, the updates to the transformed machine learning model may be limited to a single layer (e.g., the final layer) of the transformed machine learning model while the other layers of the transformed machine learning model may remain unaffected by the update. Furthermore, the updates to the transformed machine learning model may be limited to the dictionary matrix of that single layer and to portions (e.g., rows) of the dictionary matrix corresponding to new categories of data.

FIG. 1 depicts a schematic diagram illustrating an example of a machine learning model 100, in accordance with some example embodiments. Referring to FIG. 1, the machine learning model 100 may be a deep learning model such as, for example, a neural network and/or the like. Furthermore, as shown in FIG. 1, the machine learning model 100 may be trained to perform a classification task in which the machine learning model 100 processes an input sample and outputs a probability vector that includes a probability of the input sample being a member of each of a plurality of classes.

Referring again to FIG. 1, the machine learning model 100 may include a plurality of layers including, for example, an input layer 110, a first intermediate layer 120a, a second intermediate layer 120b, and an output layer 130. The first intermediate layer 120a and the second intermediate layer 120b may be the hidden layers of the machine learning model 100. For example, each of the first intermediate layer 120a and the second intermediate layer 120b may be a convolution layer or a fully connected layer of the machine learning model 100. Moreover, each of the first intermediate layer 120a and/or the second intermediate layer 120b may be implemented as a core computation layer, normalization layer, pooling layer, non-linear layer, and/or the like. It should be appreciated that the machine learning model 100 may include a different quantity of hidden layers than shown in FIG. 1. Table 1 below depicts examples of core computation layers, normalization layers, pooling layers, and non-linear layers that may be present in the machine learning model 100, for example, as the first intermediate layer 120a and/or the second intermediate layer 120b.

TABLE 1

| DL Layers | Description | |
|---|---|---|
| Core Computations | Fully-Connected | $x_{tf}^{(l)} = \sum_{f=1}^{N_t-1} \theta_{tf}^{(l-1)} \times z_j^{(l-1)}$ |
| | 2D Convolution | $x_{tf}^{(l)} = \sum_{s_1=1}^{k} \sum_{s_2=1}^{k} \theta_{s_1 s_2}^{(l-1)} \times z_{(t+s_1)(f+s_2)}^{l-1}$ |
| Normalization | $L_2$ Normalization | $x_i^{(l)} = \dfrac{x_i^{(l)}}{\sqrt{\sum_{j=1}^{N_t} |x_j^{(l)}|^2}}$ |
| | Batch Normalization | $x_t^{(l)} = \dfrac{x_i^{(l)} - \mu_B^{(l)}}{\sqrt{\dfrac{2}{x_a}\sum_{j=1}^{x_k}(x_j^{(l)} - \mu_B^{(h)})^2}}$ |
| Pooling | 2D Max Pooling | $x_{tf}^{(l)} = \text{Max}(y_{(t+s_2)(f+s_2)}^{l-1})$<br>$s_1 \in \{1,2,\ldots,k\}$<br>$s_2 \in \{1,2,\ldots,k\}$ |
| | 2D Mean Pooling | $x_{tf}^{(l)} = \text{Mean}(z_{(t+s_2)(f+s_2)}^{l-1})$<br>$s_1 \in \{1,2,\ldots,k\}$<br>$s_2 \in \{1,2,\ldots,k\}$ |
| Non-linearities | Softmax | $z_t^{(l)} = \dfrac{e^{x_i^{(l)}}}{\sum_{j=1}^{N_t} e^{x_i^{(l)}}}$ |
| | Sigmoid | $z_t^{(l)} = \dfrac{1}{1+e^{-x_t^{(l)}}}$ |
| | Tangent Hyperbolic | $z_t^{(l)} = \dfrac{\text{Sinh}(x_i^{(l)})}{\text{Cosh}(x_i^{(l)})}$ |
| | Rectified Linear unit | $zf(l) = \text{Max}(0, xf(l))$ |

The input layer 110, the first intermediate layer 120a, the second intermediate layer 120b, and the output layer 130 may each include a plurality of neurons. For example, as shown in FIG. 1, the first intermediate layer 120a may include an x quantity of neurons (e.g., as depicted by the circles labeled $n_1, n_2, n_3, n_4, \ldots, n_x$ in FIG. 1) while the second intermediate layer 120b may include a v quantity of neurons (e.g., as depicted by the circles labeled $n_1, n_2, \ldots, n_y$ in FIG. 1). As shown in FIG. 1, the neurons in each layer of the machine learning model 100 may be interconnected with neurons in a preceding layer of the machine learning model 100 and/or a subsequent layer of the machine learning model 100. For instance, each of the x quantity of neurons in the first intermediate layer 120a may be interconnected to one or more neurons in the input layer 110 as well as one or more neurons in the second intermediate layer 120b. Meanwhile, each of the y quantity of neurons in the second intermediate layer 120b may be interconnected to one or more neurons in the first intermediate layer 120a and one or more neurons in the output layer 130.

In some example embodiments, the neurons in each of the input layer 110, the first intermediate layer 120a, the second intermediate layer 120b, and the output layer 130 may be configured to apply, to one or more input values, an activation function including, for example, for example, a sigmoid function, a hyperbolic function, a rectified linear unit (ReLU) function, a maximum function, an exponential linear unit (ELU) function, and/or the like. For instance, referring again to FIG. 1, each of the x quantity of neurons in the first intermediate layer 120a may apply an activation function to a weighted sum of the one or more input values received from the neurons in the input layer 110. The results the x quantity of neurons in the first intermediate layer 120a applying the activation function may be passed to the second intermediate layer 120b where the results are weighted and summed before each of the y quantity of neurons in the second intermediate layer 120b applies another activation function.

Figure 2:
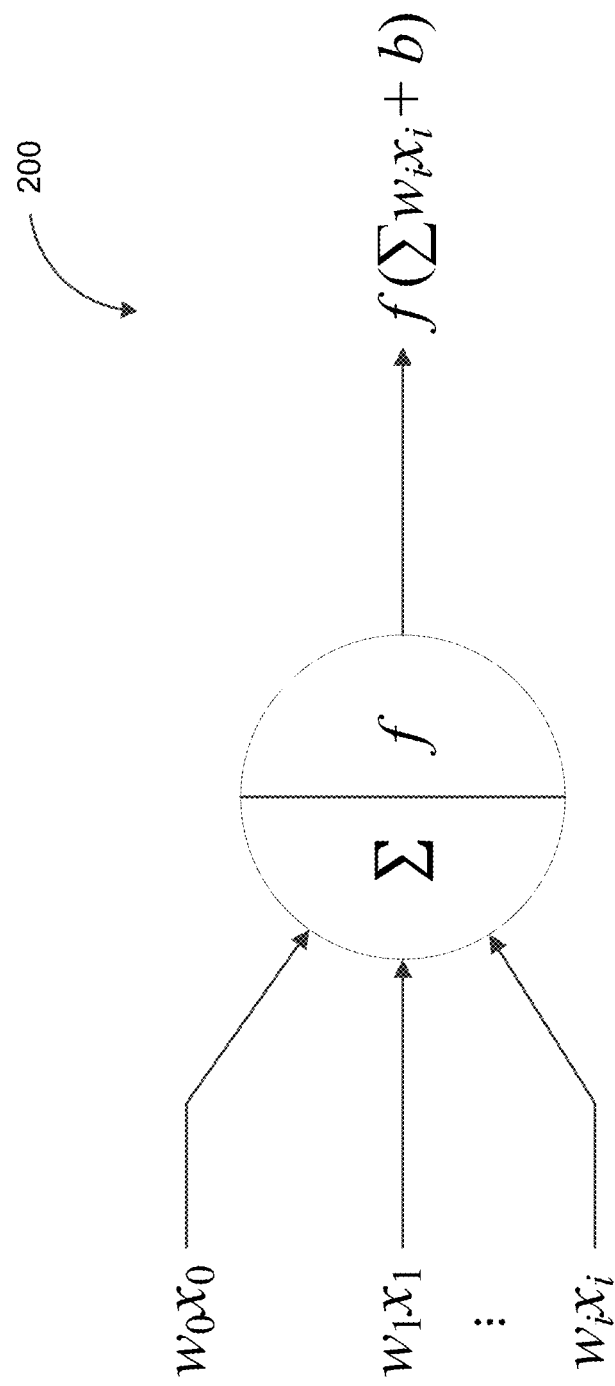
FIG. 2 depicts an example of a neuron, in accordance with some example embodiments.

To further illustrate, FIG. 2 depicts an example of a neuron 200, in accordance with some example embodiments. Referring to FIGS. 1-2, the neuron 200 may implement one or more of the neurons included in the input layer 110, the first intermediate layer 120a, the second intermediate layer 120b, and/or the output layer 130. As shown in FIG. 2, the neuron 200 may receive, as part of an input sample of the machine learning model 100 or from a preceding layer of the machine learning model 100, an i quantity of input values (e.g., $x_1, x_2, \ldots, x_i$). A corresponding weight (e.g., $w_1, w_2, \ldots, w_i$) may be applied to each of the i quantity of input values (e.g., $x_1, x_2, \ldots, x_i$) and a bias b may be added before the neuron 200 applies an activation function $f$ to the weighted sum. It should be appreciated that the activation function $f$ may be any type of activation function including, for example, a sigmoid function, a hyperbolic function, a rectified linear unit (ReLU) function, a maximum function, an exponential linear unit (ELU) function, and/or the like. The result of applying the activation function $f$ (e.g., $f(\Sigma_i w_i x_i + b)$) may be part of the output data of the machine learning model 100 or passed to a subsequent layer in the machine learning model 100 for further processing. It should be appreciated that the values of the weights (e.g., $w_1, w_2, \ldots, w_i$) and the bias b may be determined as part of training the machine learning model 100. For example, the values of the weights (e.g., $w_1, w_2, \ldots, w_i$) and the bias b may be adjusted during the training of the machine learning model 100 to minimize an error in the output of the machine learning model 100.

Figure 3:
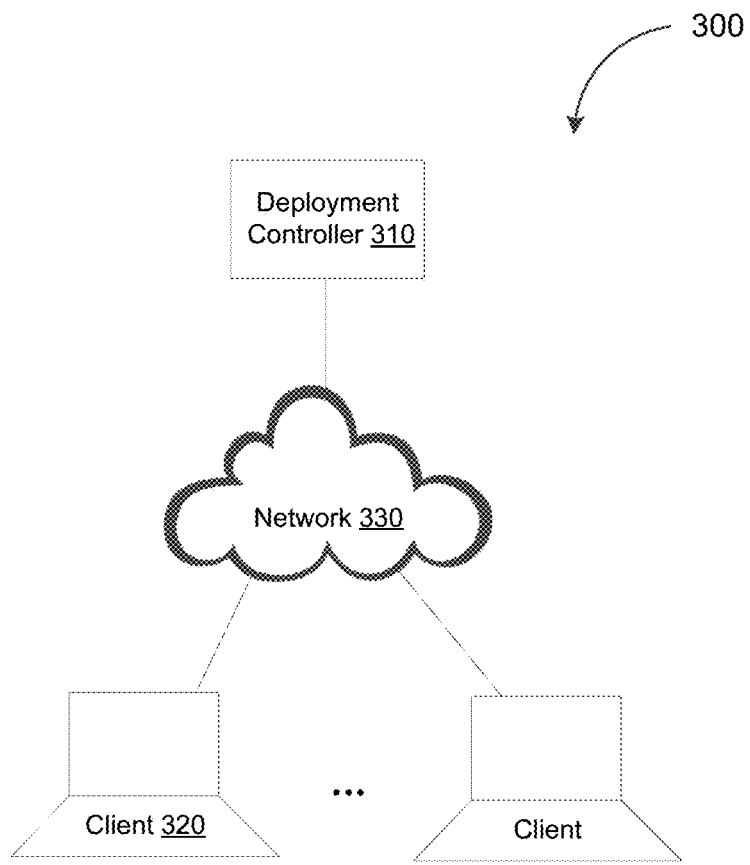
FIG. 3 depicts a system diagram illustrating a deployment system, in accordance with some example embodiments.

FIG. 3 depicts a system diagram illustrating a deployment system 300, in accordance with some example embodiments. As shown in FIG. 3, the deployment system 300 may include a deployment controller 310 communicatively coupled to one or more clients. For example, as shown in FIG. 3, the deployment controller 310 may be communicatively coupled to a client 320 via a network 330. The network 330 may be any wired and/or wireless network including, for example, a local area network (LAN), a virtual local area network (VLAN), a wide area network (WAN), a public land mobile network (PLMN), the Internet, and/or the like.

The deployment controller 310 may be configured to train one or more machine learning models including, for example, the machine learning model 100. For instance, training the machine learning model 100 may include adjusting the values of the weights (e.g., $w_1, w_2, \ldots, w_i$) applied by each layer of the machine learning model 100 to at least minimize an error in the output of the machine learning model 100. Moreover, the deployment controller 310 may be configured to deploy, to the client 320, the trained machine learning model 100'.

The client 320 may be a resource-constrained device such as, for example, a drone, a robot, a smartphone, a tablet computer, a wearable apparatus, or a voice assistant. As such, in some example embodiments, the deployment controller 310 may transform the trained machine learning model 100' to at least reduce the resources required to update the machine learning model 100 at the client 320. As such, the transformed machine learning model 100" may be updated at the client 320 without requiring a large quantity of training data and/or undergoing numerous iterations of training.

Figure 4:
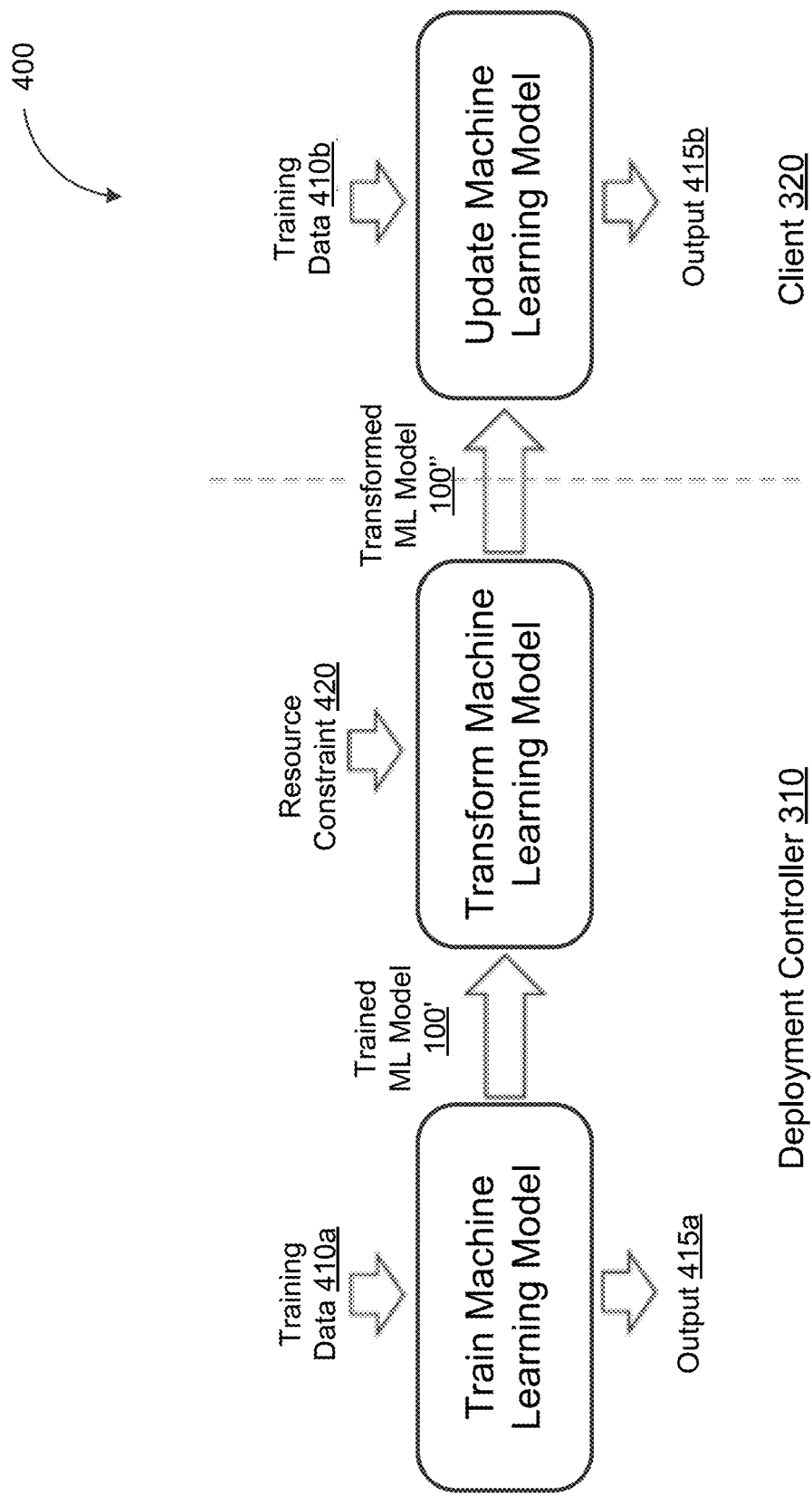
FIG. 4 depicts a block diagram illustrating a data flow within a deployment system, in accordance with some example embodiments.

To further illustrate, FIG. 4 depicts a data flow 400 within the deployment system 300, in accordance with some example embodiments. Referring to FIGS. 3-4, the deployment controller 310 may train, based at least on a first training data 410a, the machine learning model 100. Training the machine learning model 100 may include adjusting the values of the weights (e.g., $w_1, w_2, \ldots, w_i$) applied by each layer of the machine learning model 100 to at least minimize an error in a first output 415a of the machine learning model 100. It should be appreciated that the first training data 400a may include one or more samples, each of which associated with a ground-truth label corresponding to a correct classification of the sample. Meanwhile, the first output 410a may include labels classifying each of the samples included in the first training data 400a. As such, the error in the first output 410a of the machine learning model 100 may include a discrepancy between the labels included in the first output 410a and the ground-truth labels for the corresponding samples included in the first training data 400a.

The deployment controller 310 may, as noted, transform the trained machine learning model 100' in order to reduce the resources required to update the machine learning model 100 at the client 320. As shown in FIG. 4, the trained machine learning model 100' may be transformed in accordance with a resource constraint 420 of the client 320 including, for example, the memory, processor, and/or bandwidth available at the client 320 for updating the machine learning model 100. For instance, in some example embodiments, the deployment controller 310 may transform the trained machine learning model 100' by replacing at least one layer of the trained machine learning model 100' with a dictionary matrix and a coefficient matrix formed by at least decomposing the weight matrix associated with that layer of the trained machine learning model 100'. The length of the dictionary matrix (e.g., the quantity of columns included in the dictionary matrix) may determine the resources required to update the transformed machine learning model 100" at the client 320. Accordingly, transforming the trained machine learning model 100' into the transformed machine learning model 100" may include decomposing the weight matrix associated with at least one layer of the trained machine learning model 100' into a dictionary matrix whose length does not exceed the resource constraint 420 of the client 320.

For example, each layer of the machine learning model 100 including, for example, the input layer 110, the first intermediate layer 120a, the second intermediate layer 120b, and the output layer 130, may be associated with a weight matrix $W_{m \times n}$. Each element included in the weight matrix $W_{m \times n}$ may correspond to one of a plurality of weights (e.g., $w_1, w_2, w_i$) applied at a corresponding layer of the machine learning model 100. The weight matrix $W_{m \times n}$ may be decomposed, by subspace projection, into a coefficient matrix $C_{l \times n}$ and a dictionary matrix $D_{m \times l}$. The product of the dictionary matrix $D_{m \times l}$ and the coefficient matrix $C_{l \times n}$ may provide a reduced-dimension representation DC of the weight matrix $W_{m \times n}$ in which $l \ll n$. Each column in the weight matrix $W_{m \times n}$ may be reconstructed as a linear combination of one or more columns in the dictionary matrix $D_{m \times l}$ as determined by the coefficient matrix $C_{l \times n}$.

It should be appreciated that 1 may denote a dimensionality of an ambient space subsequent to the projection. Moreover, the reduced-dimension representation DC of the weight matrix $W_{m \times n}$ may be associated with a decomposition error threshold $\beta$, which may correspond to a maximum tolerable difference between the weight matrix $W_{m \times n}$ and the reduced-dimension representation DC of the weight matrix $W_{m \times n}$ based on the coefficient matrix $C_{l \times n}$ and the dictionary matrix $D_{m \times l}$ (e.g., $|W-DC|<\beta$). It should be appreciated that each layer of the trained machine learning model 100' may be associated with a same or different decomposition error threshold $\beta$. Moreover, the deployment controller 310 may adjust the decomposition error threshold $\beta$ associated with different layers of the trained machine learning model 100' individually in order the resulting transformed machine learning model 100" to satisfy a resource constraint of the client 320 and/or achieve a target accuracy for the transformed machine learning model 100".

The length of the dictionary matrix $D_{m \times l}$ (e.g., the quantity of columns included in the dictionary matrix $D_{m \times l}$) may be adjusted in order for the reduced-dimension representation DC of the weight matrix $W_{m \times n}$ to satisfy the decomposition error threshold $\beta$. For example, the length of the dictionary matrix $D_{m \times l}$ (e.g., the quantity of columns included in the dictionary matrix $D_{m \times l}$) may be increased in order to reduce the decomposition error associated with the reduced-dimension representation DC of the weight matrix $W_{m \times n}$ such that the decomposition error associated with the reduced-dimension representation DC of the weight matrix $W_{m \times n}$ does not exceed the decomposition error threshold $\beta$.

In some example embodiments, the deployment controller 310 may apply an iterative algorithm to decomposed the weight matrix $W_{m \times n}$ into the coefficient matrix $C_{l \times n}$ and the dictionary matrix $D_{m \times l}$. Table 2 below depicts an example of an adaptive projection algorithm for iteratively decomposing the weight matrix $W_{m \times n}$ into the coefficient matrix $C_{l \times n}$ and the dictionary matrix $D_{m \times l}$.

TABLE 2

Algorithm Adaptive Projection inputs: Normalized weight matrix $W_{m \times n}$, decomposition error threshold $\beta$
outputs: Coefficient matrix $C_{l \times n}$, dictionary matrix $D_{m \times l}$, length of dictionary l
1:     D ← rnd(m, 1)
2:     err ← ∞
3:     while err > $\beta^2$ do
4:     
$$E \leftarrow \frac{\|D(D^t D)^{-1} D^t A - A\|_2}{\|A\|_2}$$

5:     idk ← argmax(E)
6:     D ← [D, $A_{:,idx}$]
7:     C ← D†A
8:     err ← $\|DC - A\|_2$
9:     end while As shown in Table 2, at each stage of iteratively decomposing the weight matrix $W_{m \times n}$, the deployment controller 310 may add, to the dictionary matrix $D_{m \times l}$, a column from the weight matrix $W_{m \times n}$ that minimizes the decomposition error associated with the reduced-dimension representation DC of the weight matrix $W_{m \times n}$. In doing so, the deployment controller 310 may increase the length l of the dictionary matrix $D_{m \times l}$ until the decomposition error associated with the reduced-dimension representation DC of the weight matrix $W_{m \times n}$ satisfy the decomposition error threshold $\beta$.

Transforming the trained machine learning model 100' into the transformed machine learning model 100" may, as noted, further include replacing at least one layer of the trained machine learning model 100' with the reduced-dimension representation DC of the weight matrix $W_{m \times n}$ including, for example, the corresponding dictionary matrix $D_{m \times l}$ and the coefficient matrix $C_{l \times n}$. According to some example embodiments, the trained machine learning model 100' may be transformed by replacing one or more fully-connected layers with the corresponding reduced-dimension representation DC of the weight matrix $W_{m \times n}$ associated with each fully-connected layer.

Figure 5A:
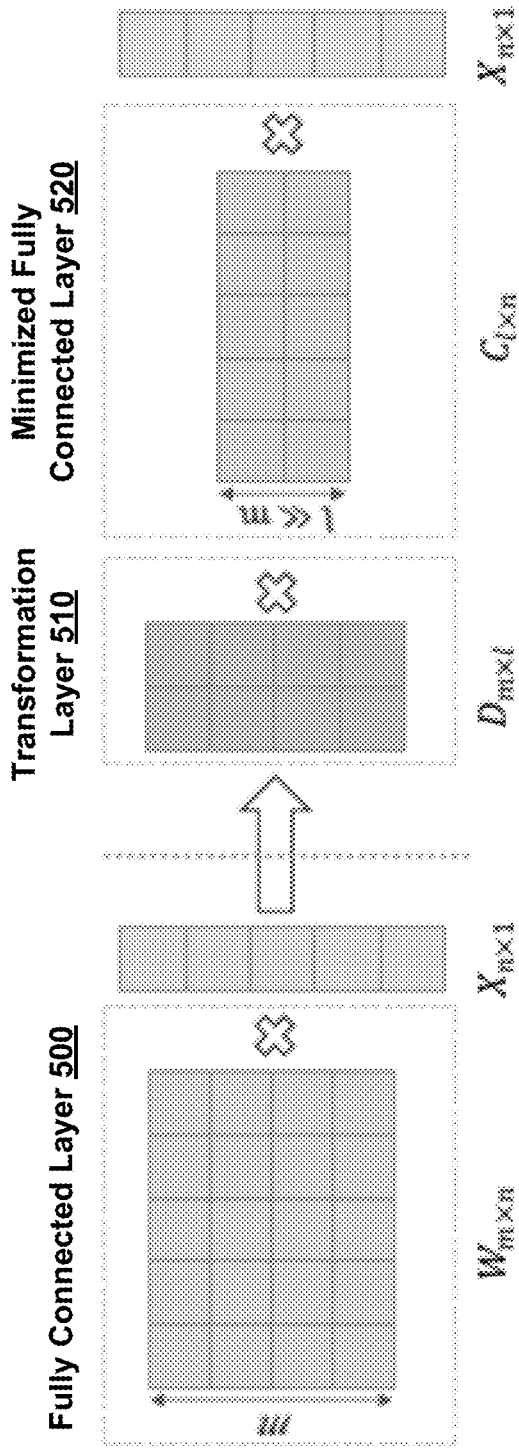
FIG. 5A depicts an example of transforming a fully-connected layer of a machine learning model, in accordance with some example embodiments.

To further illustrate, FIG. 5A depicts an example of transforming a fully-connected layer 500 in the machine learning model 100, in accordance with some example embodiments. Prior to transformation, the fully-connected layer 500 may operate on an input vector $x_{n \times 1}$ by at least multiplying the weight matrix $W_{m \times n}$ and the input vector $x_{n \times 1}$ to generate an output vector $y_{m \times 1}$ as shown in Equation (1) below.

$$y_{m \times 1} = W_{m \times n} x_{n \times 1} \quad (1)$$

According to some example embodiments, the fully-connected layer 500 may be replaced by a transformation layer 510 corresponding to the dictionary matrix $D_{m \times l}$ followed by a minimized fully-connected layer 520 corresponding to the coefficient matrix $C_{l \times n}$. Equation (2) shows that the resulting transformed fully-connected layer may operate on the input vector $x_{n \times 1}$ by at least multiplying the dictionary matrix $D_{m \times l}$, the coefficient matrix $C_{l \times n}$, and the input vector $x_{n \times 1}$ to generate the output vector $y_{m \times 1}$.

$$y_{m \times 1} = D_{m \times l} C_{l \times n} x_{n \times 1} \quad (2)$$

Figure 5B:
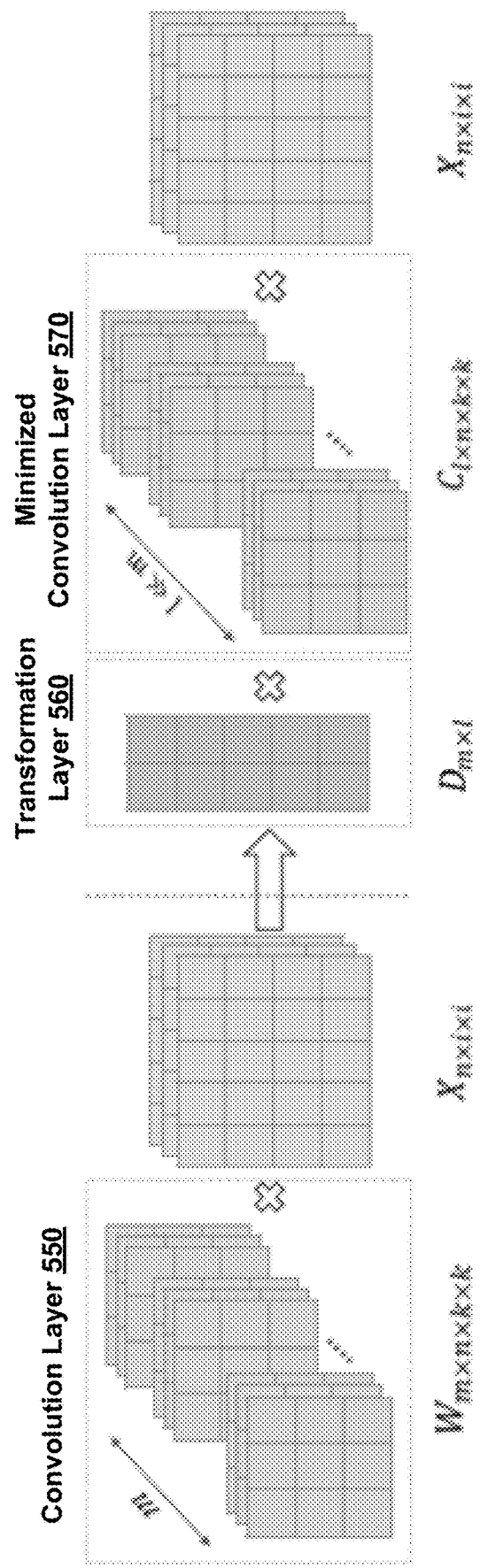
FIG. 5B depicts an example of transforming a convolution layer of a machine learning model, in accordance with some example embodiments.

Alternatively and/or additionally, the trained machine learning model 100' may be transformed by replacing one or more convolution layers with the corresponding reduced-dimension representation DC of the weight matrix $W_{m \times n}$ associated with each convolution layer. FIG. 5B depicts an example of transforming a convolution layer 550 of the machine learning model 100, in accordance with some example embodiments.

The convolution layer 550 may be associated with a weight tensor $W_{m \times n \times k \times k}$. Prior to transformation, the convolution layer 550 may operate on an input tensor $X_{n \times i \times i}$ by at least multiplying the weight tensor $W_{m \times n \times k \times k}$ and the input tensor $X_{n \times i \times i}$. As shown in FIG. 5B, transforming the convolution layer 550 may include replacing the convolution layer with a transformation layer 560 corresponding to the dictionary matrix $D_{m \times l}$ followed by a minimized convolution layer 570 corresponding to a coefficient tensor $C_{l \times n \times k \times k}$. Each element in the dictionary matrix $D_{m \times l}$ may be multiplied by every element in a corresponding channel of the minimized convolution layer 570 while the resulting channels may be summed up element-wise to generate a single output channel. Accordingly, the transformation layer 560 may apply linear combination to transform an l-channel input into an m-channel output, in which $l \ll m$.

Referring again to FIG. 4, the client 320 may update, based at least on a second training data 410b, the transformed machine learning model 100" deployed at the client 320. The second training data 410b may be specific to the client 320 such that updating the transformed machine learning model 100" may customize the machine learning model 100 for the client 320 and/or a user associated with the client 320. As noted, the transformed machine learning model 100" may be updated at the client 320 without requiring a large quantity of training data and/or undergoing numerous iterations of training. For example, transforming the machine learning model 100 may reduce the quantity of trainable parameters by approximately a factor of $$\frac{l}{m},$$

where $l \ll m$.

According to some example embodiments, the updates to the transformed machine learning model 100" may be limited to a first portion of the transformed machine learning model 100" while a second portion of the transformed machine learning model 100" remains unaffected by the update. Updating some but not all portions of the transformed machine learning model 100" may further reduce the resource overhead associated with updating the machine learning model 100 while preserving the post-update accuracy of the transformed machine learning model 100". For example, the labels included in a second output 410b of the transformed machine learning model 100" post update may exhibit minimal discrepancy relative to the ground-truth labels for the corresponding samples included in the second training data 400a.

Figure 6:
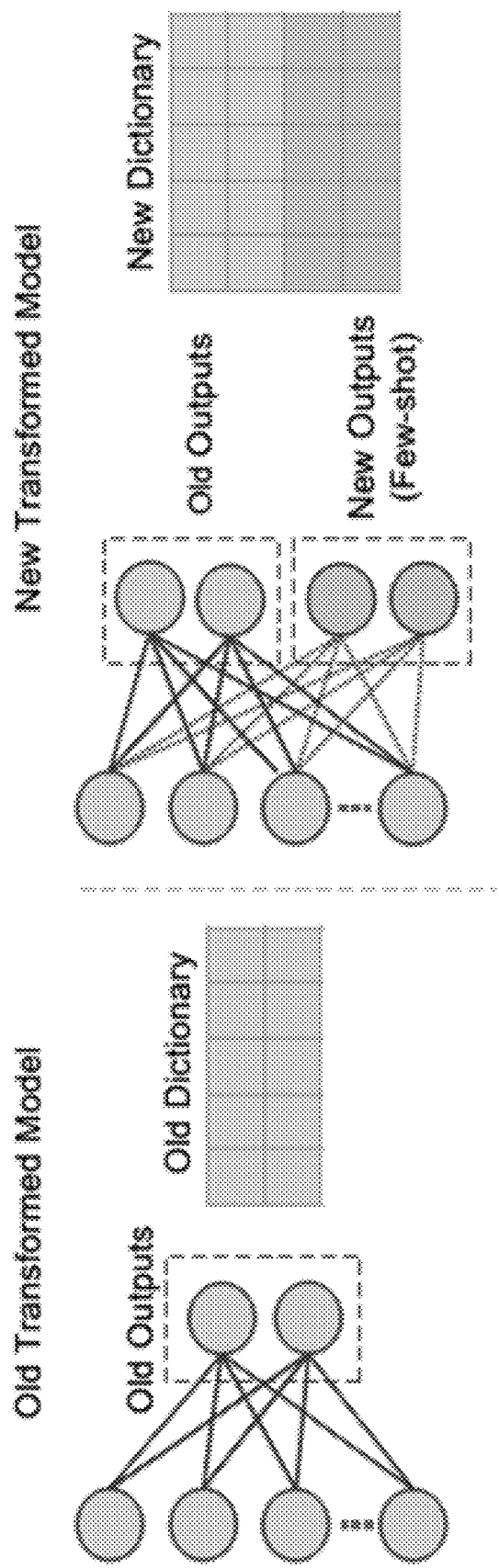
FIG. 6 depicts a flowchart illustrating a process for deploying a machine learning model, in accordance with some example embodiments.

In some example embodiments, the transformed machine learning model 100" may be updated at the client 320 by at least updating, based on the second training data 410b, the coefficient matrices associated with one or more layers of the transformed machine learning model 100" but not the corresponding dictionary matrices. Alternatively, the transformed machine learning model 100" may be updated at the client 320 by updating, based at least on the second training data 410b, the dictionary matrix of some but not all of the layers of the transformed machine learning model 100". For example, the updates to the transformed machine learning model 100" may be limited to a single layer of the transformed machine learning model 100" (e.g., a final layer prior to an output of the transformed machine learning model 100") while the other layers of the transformed machine learning model 100" may remain unaffected by the update. Furthermore, the updates to the transformed machine learning model 100" may be limited to the dictionary matrix of that single layer. For instance, as shown in FIG. 6, the transformed machine learning model 100" may be updating by inserting, into the dictionary matrix of a single layer of the transformed machine learning model 100", one or more rows corresponding to second training data 410b without modifying any existing portions of the dictionary matrix.

Figure 7:
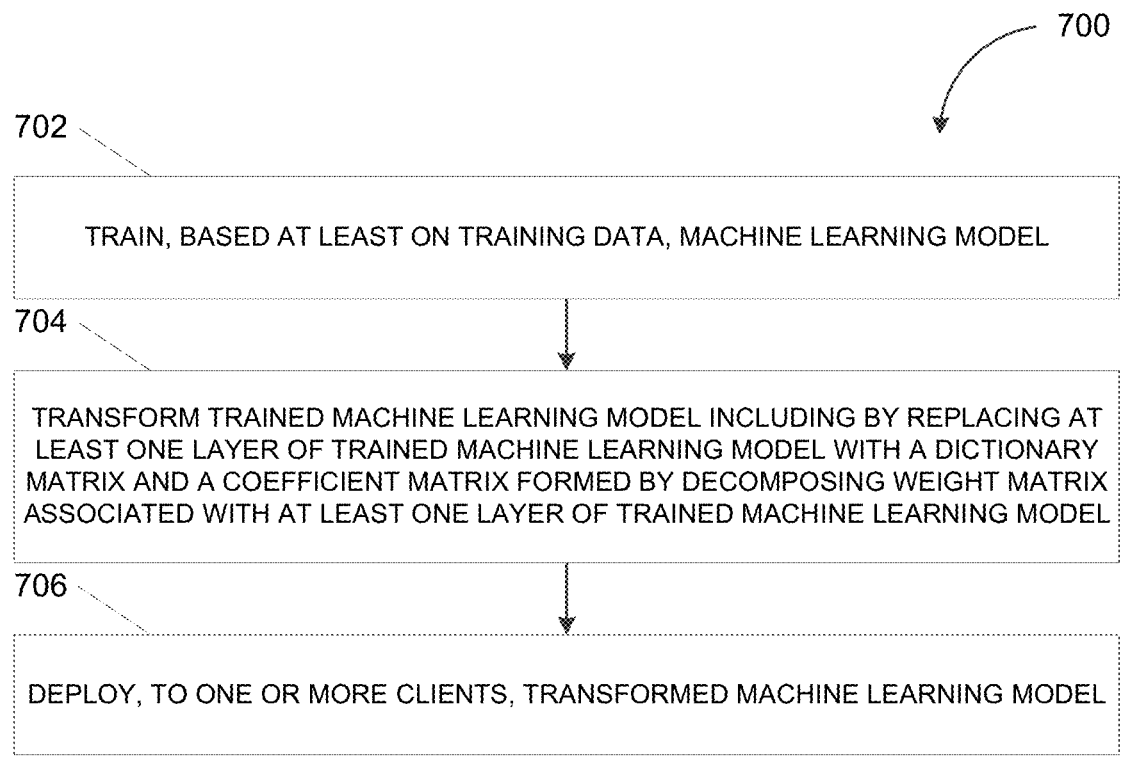
FIG. 7 depicts a flowchart illustrating an example of a process for updating a machine learning model, in accordance with some example embodiments.

FIG. 7 depicts a flowchart illustrating an example of a process 700 for deploying a machine learning model, in accordance with some example embodiments. Referring to FIGS. 1-4, 5A-B, and 6-7, the process 700 may be performed by the deployment controller 310 in order to deploy, to the client 320, the machine learning model 100.

At 702, the deployment controller 310 may train, based at least on training data, a machine learning model. For example, the deployment controller 310 may train, based at least on the first training data 410a, the machine learning model 100. Training the machine learning model 100 may include adjusting the values of the weights (e.g., $w_1, w_2, \ldots, w_i$) applied by each layer of the machine learning model 100 to at least minimize an error in the first output 415a of the machine learning model 100.

At 704, the deployment controller 310 may transform the trained machine learning model including by replacing at least one layer of the trained machine learning model with a dictionary matrix and a coefficient matrix formed by decomposing a weight matrix associated with the at least one layer of the trained machine learning model. For example, the deployment controller 310 may transform the trained machine learning model 100' by replacing at least one layer of the trained machine learning model 100' with the dictionary matrix $D_{m \times l}$ and the coefficient matrix $C_{l \times n}$, which may be formed by decomposing the weight matrix $W_{m \times n}$ associated the at least one layer of the trained machine learning model 100'. While transforming the trained machine learning model 100', the deployment controller 310 may adjust the length of the dictionary matrix $D_{m \times l}$ (e.g., the quantity of columns included in the dictionary matrix $D_{m \times l}$) such that the reduced-dimension representation DC of the weight matrix $W_{m \times n}$ to satisfy the decomposition error threshold $\beta$.

As noted, the product of the dictionary matrix $D_{m \times l}$ and the coefficient matrix $C_{l \times n}$ may provide a reduced-dimension representation DC of the weight matrix $W_{m \times n}$. That is, each column in the weight matrix $W_{m \times n}$ may be reconstructed as a linear combination of one or more columns in the dictionary matrix $D_{m \times l}$ as determined by the coefficient matrix $C_{l \times n}$. Moreover, as shown in FIGS. 5A-B, the deployment controller 310 may transform the trained machine learning model 100' by replacing one or more fully connected layers and/or convolution layers of the trained machine learning model 100'

At 706, the deployment controller 310 may deploy, to one or more clients, the transformed machine learning model. For example, the deployment controller 310 may deploy the transformed machine learning model 100" at the client 320. The transformed machine learning model 100" may be trained to perform, at the client 320, one or more cognitive tasks including, for example, object identification, natural language processing, information retrieval, and speech recognition. In some example embodiments, the transformed machine learning model 100" may be deployed to the client 320 instead of the trained machine learning model 100' because the transformed machine learning model 100" may impose less resource overhead than the trained machine learning model 100'. In particular, the transformed machine learning model 100" may be updated at the client 320 without requiring a large quantity of training data and/or numerous iterations of training.

Figure 8:
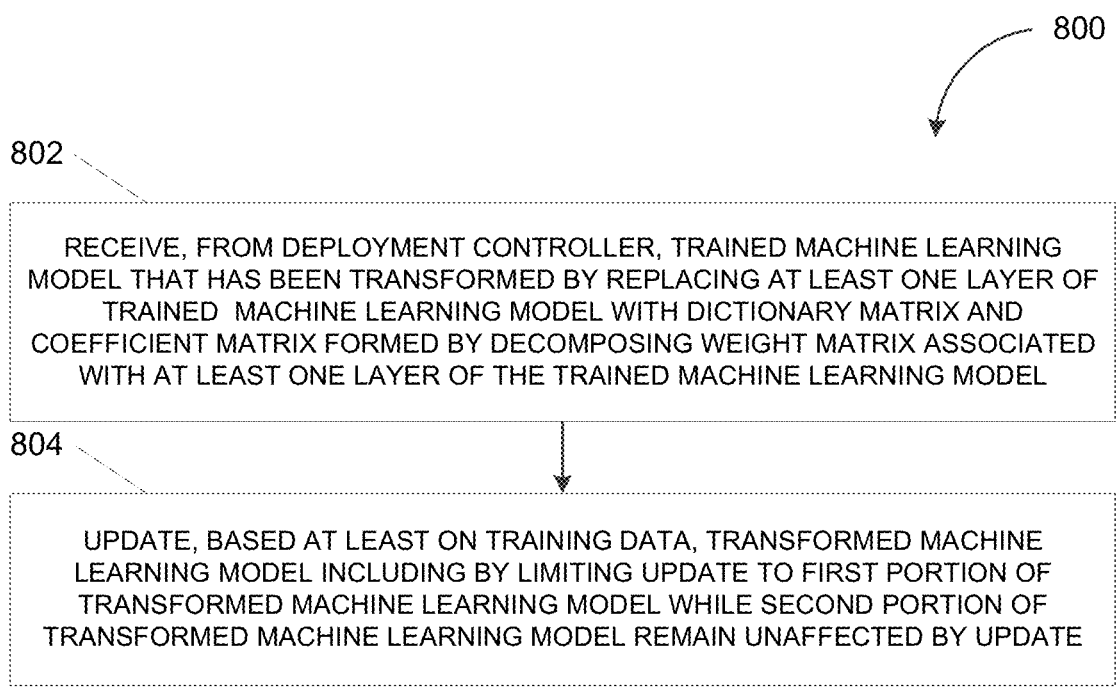
FIG. 8 depicts an example of an update to a transformed machine learning model, in accordance with some example embodiments.

FIG. 8 depicts a flowchart illustrating an example of a process 800 for updating a machine learning model, in accordance with some example embodiments. Referring to FIGS. 1-4, 5A-B, and 6-8, the process 800 may be performed by the client 320 in order to update the transformed machine learning model 100" deployed at the client 320.

At 802, the client 320 may receive, from the deployment controller 310, a trained machine learning model that has been transformed by replacing at least one layer of the trained machine learning model with a dictionary matrix and a coefficient matrix formed by decomposing a weight matrix associated with the at least one layer of the trained machine learning model. For example, the client 320 may receive, from the deployment controller 310, the transformed machine learning model 100". As noted, the deployment controller 310 may generate the transformed machine learning model 100" by replacing at least one layer of the trained machine learning model 100' with the dictionary matrix $D_{m \times l}$ and the coefficient matrix $C_{l \times n}$, which may be formed by decomposing the weight matrix $W_{m \times n}$ associated the at least one layer of the trained machine learning model 100'.

At 804, the client 320 may update, based at least on training data, the transformed machine learning model including by limiting the update to a first portion of the portion of the transformed machine learning model while a second portion of the transformed machine learning model remains unaffected by the update. For example, the client 320 may update, based at least on a second training data 410b, the transformed machine learning model 100" deployed at the client 320. The second training data 410b may be specific to the client 320 such that updating the transformed machine learning model 100" may customize the machine learning model 100 for the client 320 and/or a user associated with the client 320.

In some example embodiments, the updates to the transformed machine learning model 100" may be limited to a first portion of the transformed machine learning model 100" while a second portion of the transformed machine learning model 100" remains unaffected by the update. Doing so may further reduce the resource overhead associated with updating the machine learning model 100 while preserving the post-update accuracy of the transformed machine learning model 100". For example, the transformed machine learning model 100" may be updated at the client 320 by at least updating, based on the second training data 410b, the coefficient matrices associated with one or more layers of the transformed machine learning model 100" but not the corresponding dictionary matrices. Alternatively, the transformed machine learning model 100" may be updated at the client 320 by updating, based at least on the second training data 410b, the dictionary matrix of some but not all of the layers of the transformed machine learning model 100". The updates to the dictionary matrix may include inserting, into the dictionary matrix, one or more rows corresponding to new data classes introduced by the second training data 410b without modifying any existing portions of the dictionary matrix.

Figure 9A:
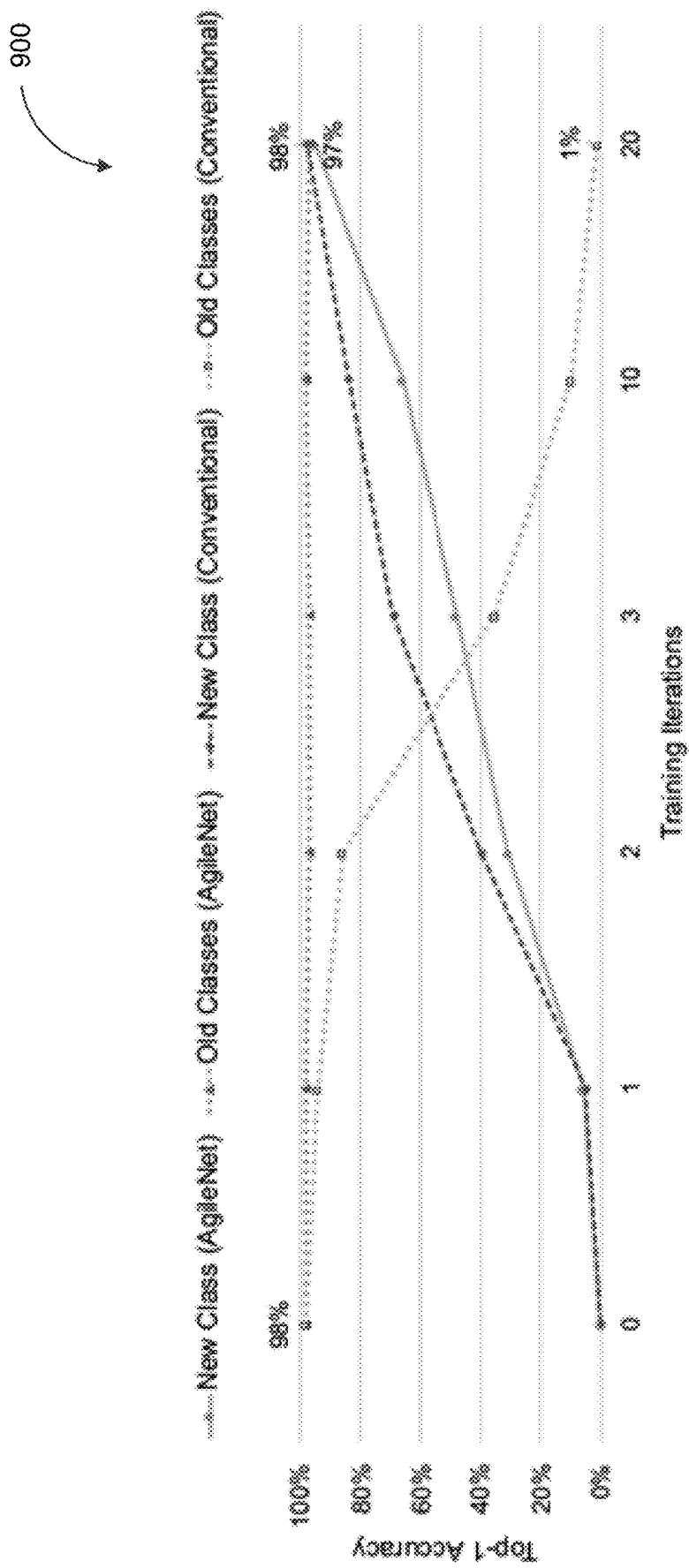
FIG. 9A depicts a graph illustrating a relationship between a quantity of training iterations for updating a transformed machine learning model and a post-update accuracy of the transformed machine learning model, in accordance with some example embodiments.

FIG. 9A depicts a graph 900 illustrating a relationship between a quantity of training iterations for updating a transformed machine learning model and a post-update accuracy of the transformed machine learning model, in accordance with some example embodiments. As shown in FIG. 9A, the transformed machine learning model 100" may achieve a high rate of accuracy after being subjected to relatively few iterations of training. Furthermore, limiting the update to a first portion of the transformed machine learning model 100" while a second portion of the transformed machine learning model 100" remains unaffected may preserve the post-update accuracy of the transformed machine learning model 100". In particular, subjecting the transformed machine learning model 100" to a limited update may maintain the ability of the transformed machine learning model 100" to correctly classify data that the transformed machine learning model 100" had been trained to correctly classify prior to the update.

Figure 9B:
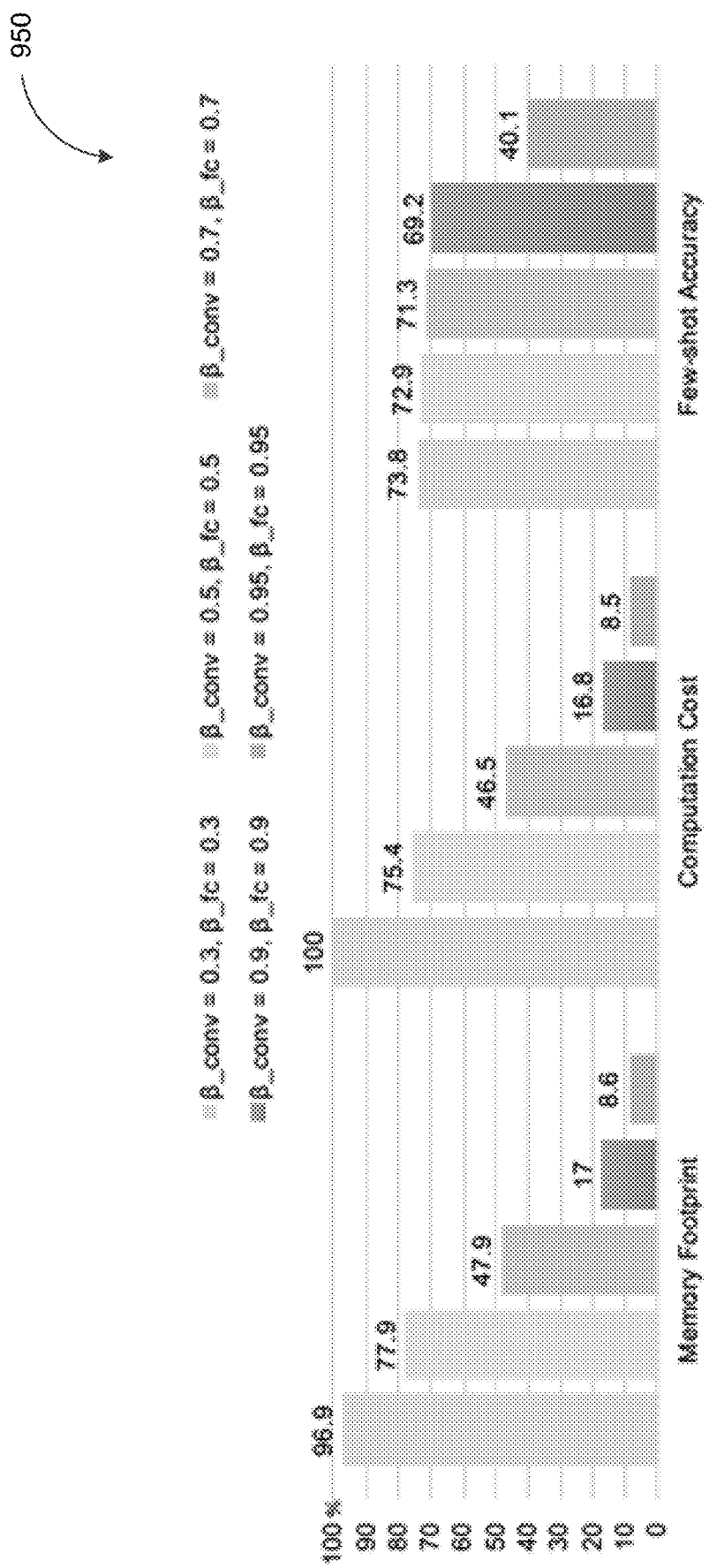
FIG. 9B depicts a graph illustrating a relationship between a decomposition error threshold associated with transforming a trained machine learning model, a resource requirement of updating the transformed machine learning model post transformation, and a post-update accuracy of the transformed machine learning model, in accordance with some example embodiments.

FIG. 9B depicts a graph 950 illustrating a relationship between a decomposition error threshold associated with transforming a trained machine learning model, a resource requirement of updating the transformed machine learning model, and a post-update accuracy of the transformed machine learning model, in accordance with some example embodiments. Referring to FIG. 9B, the decomposition error threshold $\beta$ that is applied, for example, during the decomposition of the weight matrix $W_{m \times n}$ associated with one or more layers of the trained machine learning model 100', may determine the memory footprint, computation cost, and post-update accuracy of the transformed machine learning model 100". As shown in FIG. 9B, the memory footprint and the computation cost associated with the transformed machine learning model 100" may decrease as the decomposition error threshold β increases. Meanwhile, the post-update accuracy of the transformed machine learning model 100" may also be inversely proportional to the decomposition error threshold β. However, as the decomposition error threshold β increases, FIG. 9B shows the post-update accuracy of the transformed machine learning model 100" as exhibiting a negligible decrease until the decomposition error threshold reaches 0.95.

Figure 9C:
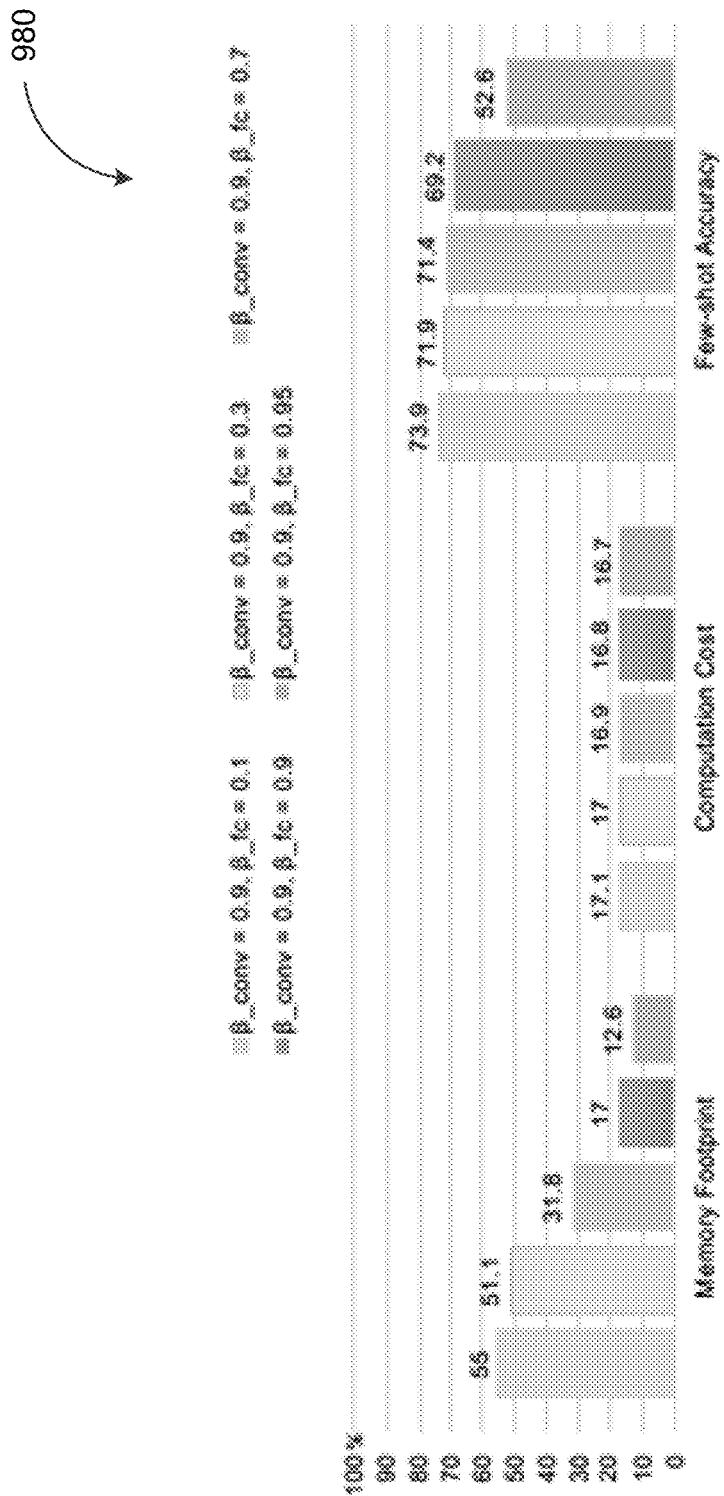
FIG. 9C depicts a graph illustrating a relationship between a decomposition error threshold associated with transforming a trained machine learning model, a resource requirement of updating the transformed machine learning model post transformation, and a post-update accuracy of the transformed machine learning model, in accordance with some example embodiments.

FIG. 9C depicts a graph 980 illustrating a relationship between a decomposition error threshold associated with transforming a trained machine learning model, a resource requirement of updating the transformed machine learning model post transformation, and a post-update accuracy of the transformed machine learning model, in accordance with some example embodiments. As shown in FIG. 9C, varying the decomposition error threshold β that is applied during the decomposition of the weight matrix $W_{m \times n}$ of a single layer of the trained machine learning model 100' (e.g., a final layer prior to an output of the trained machine learning model 100') may have a different impact on the memory footprint, computation cost, and post-update accuracy of the transformed machine learning model 100".

For example, adjusting the decomposition error threshold β of a fully-connected layer of the trained machine learning model 100' may impact primarily the memory footprint of the resulting transformed machine learning model 100" whereas adjusting the decomposition error threshold β of a convolution layer of the trained machine learning model 100' may impact more the computation cost associated with the transformed machine learning model 100". Nevertheless, decreasing the decomposition error threshold β of a fully-connected layer may also decrease the memory footprint of the transformed machine learning model 100". Moreover, as the decomposition error threshold β decreases, the concomitant decrease in the post-update accuracy of the transformed machine learning model 100" may be negligible until the decomposition error threshold β reaches 0.95. Accordingly, as noted, the decomposition error threshold β associated with different layers of the trained machine learning model 100' may undergo individual adjustments in order for the resulting transformed machine learning model 100" to achieve a threshold resource requirement and/or post-update accuracy.

Figure 10:
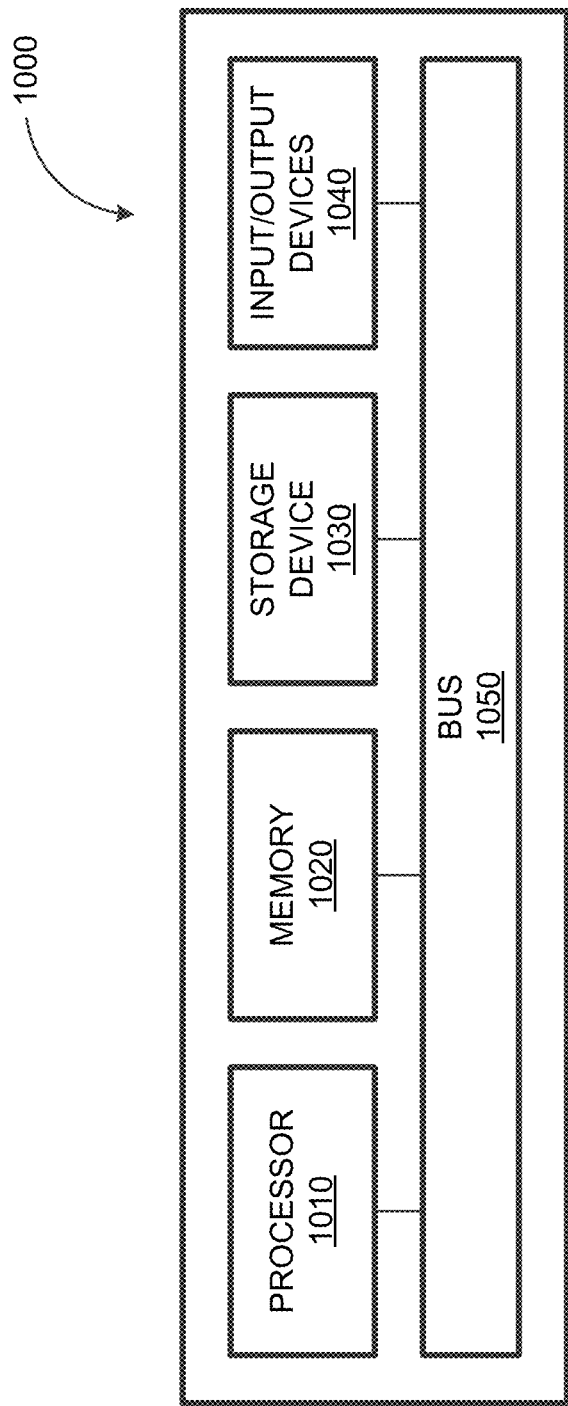
FIG. 10 depicts a block diagram illustrating a computing system, in accordance with some example embodiments; and When practical, similar reference numbers denote similar structures, features, or elements.

FIG. 10 depicts a block diagram illustrating a computing system 1000, in accordance with some example embodiments. Referring to FIGS. 1 and 5, the computing system 1000 can be used to implement the deployment controller 310, the client 320, and/or any components therein.

As shown in FIG. 10, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, the deployment controller 310, and/or the client 320. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one processor; and
    at least one memory including program code which when executed by the at least one processor provides operations comprising:
        receiving, at a client device, a trained machine learning model that has been transformed by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model;
        updating, at the client device and based at least on a first training data acquired at the client device, the trained machine learning model; and
        applying, at the client device, the updated machine learning model to perform one or more tasks.

2. The system of claim 1, wherein the at least one layer of the trained machine learning model comprise a fully-connected layer and/or a convolution layer of the trained machine learning model.

3. The system of claim 1, wherein the trained machine learning model is generated by training, based at least a second training data, a machine learning model, and wherein the training of the machine learning model includes adjusting one or more weights included in the weight matrix to at least minimize an error in an output of the machine learning model.

4. The system of claim 1, wherein the update to the trained machine learning model is limited to a first portion of the trained machine learning model while a second portion of the trained machine learning model remains unaffected by the update.

5. The system of claim 4, wherein the update to the trained machine learning model is limited to one or more coefficient matrices associated with one or more layers of the trained machine learning model.

6. The system of claim 4, wherein the update to the trained machine learning model is limited to a single dictionary matrix associated with a single layer of the trained machine learning model.

7. The system of claim 6, wherein the update to the trained machine learning model is further limited to inserting, into the single dictionary matrix, one or more rows corresponding to the first training data without modifying any existing portions of the single dictionary matrix.

8. The system of claim 6, wherein the single layer of the trained machine learning model comprises a final layer of the trained machine learning model prior an output of the trained machine learning model.

9. The system of claim 1, wherein the decomposing of the weight matrix includes increasing a length of the dictionary matrix until a decomposition error associated with the at least one layer of the trained machine learning model is below a threshold value, and wherein the decomposition error comprises a difference between the weight matrix and the reduced-dimension representation of the weight matrix comprising the product of the dictionary matrix and the coefficient matrix.

10. The system of claim 9, wherein a first layer of the trained machine learning model is associated with a first threshold value, and wherein a second layer of the trained machine learning model is associated with a second threshold value.

11. The system of claim 10, wherein the first threshold value and/or the second threshold value are adjusted based at least on one or more resource constraints associated with the client device.

12. The system of claim 10, wherein the first threshold value and/or the second threshold value are adjusted based at least on a target accuracy for the trained machine learning model.

13. The system of claim 1, wherein each column in the weight matrix comprises a linear combination of one or more columns from the dictionary matrix as determined by the coefficient matrix.

14. The system of claim 1, wherein the trained machine learning model comprises a neural network.

15. A computer-implemented method, comprising:
    receiving, at a client device, a trained machine learning model that has been transformed by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model;
    updating, at the client device and based at least on a first training data acquired at the client device, the trained machine learning model; and
    applying, at the client device, the updated machine learning model to perform one or more tasks.

16. The method of claim 15, wherein the trained machine learning model is generated by training, based at least a second training data, a machine learning model, and wherein the training of the machine learning model includes adjusting one or more weights included in the weight matrix to at least minimize an error in an output of the machine learning model.

17. The method of claim 15, wherein the update to the trained machine learning model is limited to a first portion of the trained machine learning model while a second portion of the trained machine learning model remains unaffected by the update.

18. The method of claim 17, wherein the update to the trained machine learning model is limited to one or more coefficient matrices associated with one or more layers of the trained machine learning model.

19. The method of claim 17, wherein the update to the trained machine learning model is limited to a single dictionary matrix associated with a single layer of the trained machine learning model, and wherein the update to the trained machine learning model is further limited to inserting, into the single dictionary matrix, one or more rows corresponding to the first training data without modifying any existing portions of the single dictionary matrix.

20. A non-transitory computer-readable medium storing instructions, which when executed by at least one data processor, result in operations comprising:
    receiving, at a client device, a trained machine learning model that has been transformed by replacing at least one layer of the trained machine learning model with a dictionary matrix and a coefficient matrix, the dictionary matrix and the coefficient matrix formed by at least decomposing a weight matrix associated with the at least one layer of the trained machine learning model, and a product of the dictionary matrix and the coefficient matrix comprising a reduced-dimension representation of the weight matrix associated with the at least one layer of the trained machine learning model;
    updating, at the client device and based at least on a first training data acquired at the client device, the trained machine learning model; and
    applying, at the client device, the updated machine learning model to perform one or more tasks.

* * * * *

UNITED STATES PATENT AND TRADEMARK OFFICE
CERTIFICATE OF CORRECTION

PATENT NO. : 11,386,326 B2
APPLICATION NO. : 16/438326
DATED : July 12, 2022
INVENTOR(S) : Lin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this
Eleventh Day of February, 2025

Coke Morgan Stewart
*Acting Director of the United States Patent and Trademark Office*